(12) United States Patent
Reddy et al.

(10) Patent No.: US 7,530,396 B1
(45) Date of Patent: May 12, 2009

(54) SELF REPAIRING CEMENT COMPOSITIONS AND METHODS OF USING SAME

(75) Inventors: B. Raghava Reddy, Duncan, OK (US); Feng Liang, Duncan, OK (US); Russell M. Fitzgerald, Waurika, OK (US); David Meadows, Rush Springs, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/107,416

(22) Filed: Apr. 22, 2008

Related U.S. Application Data

(60) Provisional application No. 61/023,248, filed on Jan. 24, 2008.

(51) Int. Cl.
*E21B 33/13* (2006.01)
(52) U.S. Cl. ...................................... 166/293
(58) Field of Classification Search .................. 166/293
See application file for complete search history.

(56) References Cited

U.S. PATENT DOCUMENTS

| | | | |
|---|---|---|---|
| 3,406,756 A | 10/1968 | Carter et al. |
| 3,719,230 A | 3/1973 | Kemp et al. |
| 3,730,271 A | 5/1973 | Gall |
| 3,758,656 A | 9/1973 | Shih |
| 4,088,808 A | 5/1978 | Cornwell et al. |
| 4,174,230 A | 11/1979 | Hashimoto et al. |
| 4,421,169 A | 12/1983 | Dearth et al. |
| 4,460,627 A | 7/1984 | Weaver et al. |
| 4,486,316 A | 12/1984 | Carriere et al. |
| 4,532,052 A | 7/1985 | Weaver et al. |
| 4,649,998 A | 3/1987 | Friedman |

(Continued)

FOREIGN PATENT DOCUMENTS

DE        19732145 A1    1/1999

(Continued)

OTHER PUBLICATIONS

Cavanagh, P., et al., "Self-healing cement—novel technology to achieve leak-free wells," SPE/IADC 105781, SPE/IADC Drilling Conference, Amsterdam, The Netherlands, Feb. 20-22, 2007, pp. 1-13, SPE/IADC Drilling Conference.

(Continued)

*Primary Examiner*—William P Neuder
(74) *Attorney, Agent, or Firm*—Craig W. Roddy; Conley Rose, P.C.

(57) ABSTRACT

A method of servicing a wellbore comprising placing a cement composition comprising a cementitious material, water, and an elastomeric material comprising a bonding polar group into a wellbore, and allowing the cement composition to set to form a set cement, wherein the elastomeric material has a phase transition temperature, exhibits cold flow behavior, or both at less than or equal to the bottom hole static temperature of the wellbore. A method of servicing a cased wellbore penetrating a formation, comprising introducing a self-repairing cementitious material into a wellbore, and allowing the cement to set, wherein upon a loss of structural integrity the set cement self-repairs, and wherein the loss of structural integrity comprises the formation of flow pathways for fluid migration in the cement and self-repair comprises obstructing potential pathways for fluid migration.

30 Claims, 4 Drawing Sheets

U.S. PATENT DOCUMENTS

| | | |
|---|---|---|
| 5,122,554 A | 6/1992 | Allen |
| 5,159,980 A | 11/1992 | Onan et al. |
| 5,293,938 A | 3/1994 | Onan et al. |
| 5,346,012 A | 9/1994 | Heathman et al. |
| 5,389,706 A | 2/1995 | Heathman et al. |
| 5,420,174 A | 5/1995 | Dewprashad |
| 5,564,413 A | 10/1996 | Hori et al. |
| 5,588,488 A | 12/1996 | Vijn et al. |
| 5,688,844 A | 11/1997 | Chatterji et al. |
| 5,697,440 A | 12/1997 | Weaver et al. |
| 5,738,463 A | 4/1998 | Onan |
| 5,775,425 A | 7/1998 | Weaver et al. |
| 5,779,787 A | 7/1998 | Brothers et al. |
| 5,795,924 A | 8/1998 | Chatterji et al. |
| 5,820,670 A | 10/1998 | Chatterji et al. |
| 5,833,000 A | 11/1998 | Weaver et al. |
| 5,839,510 A | 11/1998 | Weaver et al. |
| 5,860,770 A | 1/1999 | Hunt |
| 5,913,364 A | 6/1999 | Sweatman |
| 5,945,387 A | 8/1999 | Chatterji et al. |
| 6,047,772 A | 4/2000 | Weaver et al. |
| 6,059,034 A | 5/2000 | Rickards et al. |
| 6,098,711 A | 8/2000 | Chatterji et al. |
| 6,167,967 B1 | 1/2001 | Sweatman |
| 6,176,315 B1 | 1/2001 | Reddy et al. |
| 6,209,643 B1 | 4/2001 | Nguyen et al. |
| 6,209,646 B1 | 4/2001 | Reddy et al. |
| 6,234,251 B1 | 5/2001 | Chatterji et al. |
| 6,244,344 B1 | 6/2001 | Chatterji et al. |
| 6,258,757 B1 | 7/2001 | Sweatman et al. |
| 6,271,181 B1 | 8/2001 | Chatterji et al. |
| 6,308,777 B2 | 10/2001 | Chatterji et al. |
| 6,330,917 B2 | 12/2001 | Chatterji et al. |
| 6,457,524 B1 | 10/2002 | Roddy |
| 6,508,305 B1 * | 1/2003 | Brannon et al. ............. 166/293 |
| 6,582,819 B2 | 6/2003 | McDaniel et al. |
| 6,593,402 B2 | 7/2003 | Chatterji et al. |
| 6,599,863 B1 | 7/2003 | Palmer et al. |
| 6,632,527 B1 | 10/2003 | McDaniel et al. |
| 6,668,928 B2 | 12/2003 | Brothers |
| 6,830,105 B2 | 12/2004 | Thesing |
| 6,832,651 B2 | 12/2004 | Ravi et al. |
| 7,007,755 B2 | 3/2006 | Reddy et al. |
| 7,022,755 B1 | 4/2006 | Chatterji et al. |
| 7,026,272 B2 | 4/2006 | Reddy et al. |
| 7,036,586 B2 | 5/2006 | Roddy et al. |
| 7,077,203 B1 | 7/2006 | Roddy et al. |
| 7,138,446 B2 | 11/2006 | Reddy et al. |
| 7,138,449 B2 | 11/2006 | Valentine et al. |
| 7,143,828 B2 | 12/2006 | Reddy et al. |
| 7,153,575 B2 | 12/2006 | Anderson et al. |
| 7,172,022 B2 | 2/2007 | Reddy et al. |
| 7,174,962 B1 | 2/2007 | Roddy et al. |
| 7,196,040 B2 | 3/2007 | Heath et al. |
| 7,219,732 B2 | 5/2007 | Reddy |
| 7,264,053 B2 | 9/2007 | Vargo, Jr. et al. |
| 7,284,608 B2 | 10/2007 | Reddy et al. |
| 7,284,611 B2 | 10/2007 | Reddy et al. |
| 7,290,613 B2 | 11/2007 | Santra et al. |
| 7,294,194 B2 | 11/2007 | Reddy et al. |
| 7,337,841 B2 | 3/2008 | Ravi |
| 7,341,106 B2 | 3/2008 | Reddy et al. |
| 2004/0055748 A1 | 3/2004 | Reddy et al. |
| 2004/0144537 A1 | 7/2004 | Reddy et al. |
| 2004/0171499 A1 | 9/2004 | Ravi et al. |
| 2005/0061206 A1 | 3/2005 | Reddy et al. |
| 2006/0035790 A1 | 2/2006 | Okell et al. |
| 2006/0122071 A1 | 6/2006 | Reddy et al. |
| 2007/0137528 A1 | 6/2007 | Le Roy-Delage et al. |
| 2007/0151484 A1 | 7/2007 | Reddy et al. |
| 2007/0151730 A1 | 7/2007 | Reddy et al. |
| 2007/0204765 A1 | 9/2007 | Le Roy-Delage et al. |
| 2008/0099203 A1 | 5/2008 | Mueller et al. |

FOREIGN PATENT DOCUMENTS

| | | |
|---|---|---|
| EP | 0853186 A2 | 7/1998 |
| EP | 1400497 A2 | 3/2004 |
| EP | 0834644 B1 | 12/2004 |
| GB | 1093094 | 11/1967 |
| GB | 1352388 | 5/1974 |
| JP | 02-247217 A | 10/1990 |
| WO | 2004101952 A1 | 11/2004 |
| WO | 2005093202 A1 | 10/2005 |
| WO | 2007074330 A1 | 7/2007 |

OTHER PUBLICATIONS

Foreign communication from a related counterpart application—International Search Report and Written Opinion, PCT/GB2006/004826, Apr. 12, 2007, 9 pages.

Moroni, N., et al., "Overcoming the weak link in cemented hydraulic isolation," SPE 110523, SPE Annual Technical Conference and Exhibition, Anaheim, California, Nov. 11-14, 2007, pp. 1-13, Society of Petroleum Engineers.

Office Action dated Jul. 19, 2007 (7 pages), U.S. Appl. No. 11/321,113, filed Dec. 29, 2005.

Office Action (Final) dated Jan. 10, 2008 (10 pages), U.S. Appl. No. 11/321,113, filed Dec. 29, 2005.

Office Action dated May 12, 2008 (11 pages), U.S. Appl. No. 11/321,268, filed Dec. 29, 2005.

Office Action (Final) dated Jul. 9, 2008 (10 pages), U.S. Appl. No. 11/321,113, filed Dec. 29, 2005.

Roth, J., et al., "Innovative hydraulic isolation material preserves well integrity," IADC/SPE 112715, IADC/SPE Drilling Conference, Orlando, Florida, Mar. 4-6, 2008, pp. 1-14, IADC/SPE Drilling Conference.

* cited by examiner

SELF REPAIRING CEMENT COMPOSITIONS AND METHODS OF USING SAME

CROSS-REFERENCE TO RELATED APPLICATIONS

The present application claims the benefit under 35 U.S.C. § 119(e) of U.S. Provisional Application No. 61/023,248 filed Jan. 24, 2008 and entitled "Concepts and Compositions for Self-Sealing Cements," by B. Raghava Reddy, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to servicing a wellbore. More specifically, it relates to self-repairing cement compositions and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

During the productive phase of the wellbore, set cement compositions behind casing are subjected to stresses due to pressure and temperature changes in the wellbore. As a result, the cement sheath may develop cracks internally or debond at the casing or the wellbore creating flow pathways for unwanted fluid migration. Additionally, the cement may also shrink and create microannuli between the casing and the cement and/or the formation and the cement. These processes can result in an increased permeability in the cement and/or the loss of structural integrity of the cement sheath. Repairing cracked or shrunken sheaths may involve techniques such as squeeze cementing which are quite often expensive procedures and adversely affect the production efficiency due to the downtime required. Thus, an ongoing need exists for cement compositions that retain structural integrity.

SUMMARY

Disclosed herein is a method of servicing a wellbore comprising placing a cement composition comprising a cementitious material, water, and an elastomeric material comprising a bonding polar group into a wellbore, and allowing the cement composition to set to form a set cement, wherein the elastomeric material has a phase transition temperature, exhibits cold flow behavior, or both at less than or equal to the bottom hole static temperature of the wellbore.

Also disclosed herein is a method of servicing a cased wellbore penetrating a formation, comprising introducing a self-repairing cementitious material into a wellbore, and allowing the cement to set, wherein upon a loss of structural integrity the set cement self-repairs, and wherein the loss of structural integrity comprises the formation of flow pathways for fluid migration in the cement and self-repair comprises obstructing potential pathways for fluid migration.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
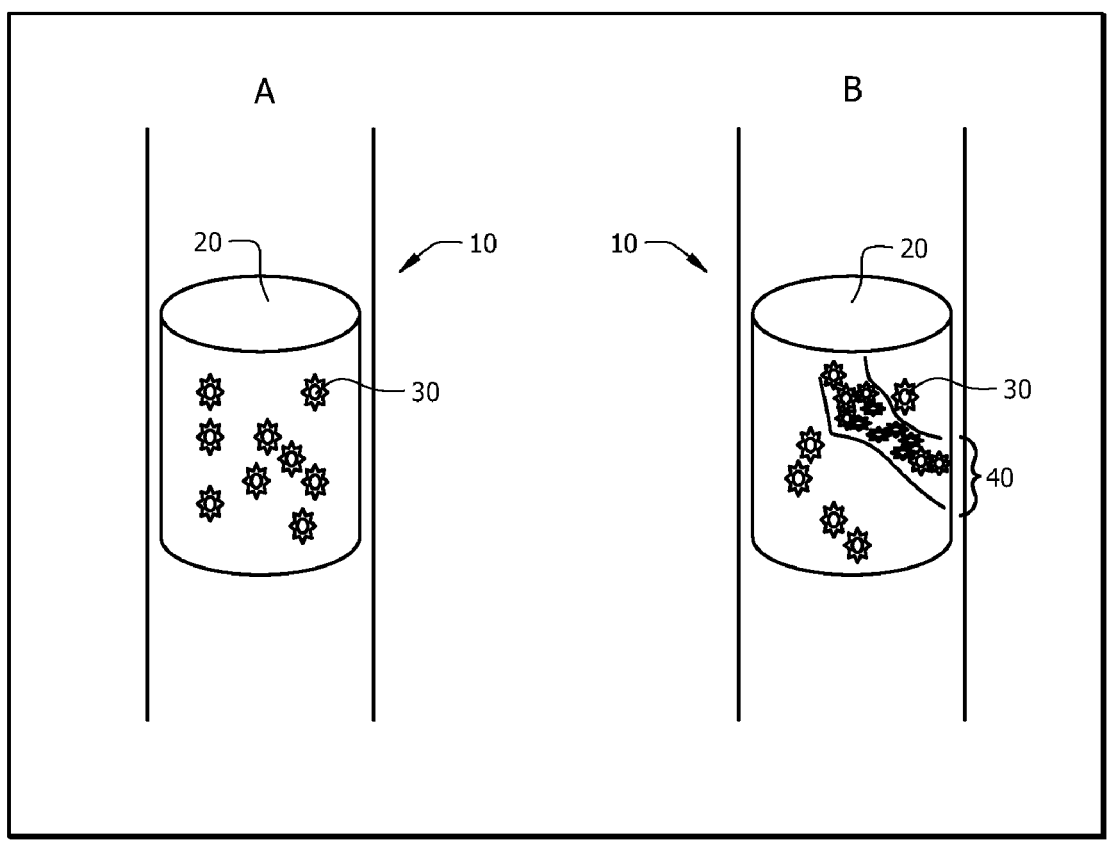
FIG. 1 is an embodiment of a self-repairing cement composition.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are cement compositions comprising a cementitious material, an elastomeric material comprising a polar group that bonds with the cementitious material, and water. Hereinafter, the disclosure will refer to a polar group that bonds with cementitious material as a "bonding polar group." The bonding polar group may additionally bond to components of the casing (e.g., metals such as iron), components in the formation (silicates), or any component disposed in proximity to the cement sheath. A method of servicing a wellbore may comprise placing such compositions into a wellbore and allowing the compositions to set. The set cement may be subjected to various forces or events that compromise the structural integrity of the material. In an embodiment, the compositions of this disclosure are able to self-repair after the loss of structural integrity and retain at least a portion of the mechanical and physical properties of the set cement. Hereinafter such compositions are referred to as self repairing cement compositions (SRCC).

In an embodiment, the SRCC comprises a cementitious material such as a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of such materials are disclosed in U.S. Pat. Nos. 6,457,524; 7,077,203; and 7,174,962, each of which is incorporated herein by reference in its entirety.

In an embodiment, the SRCC comprises an elastomeric material comprising a bonding polar group. The elastomeric material may be semi-crystalline, amorphous, partially amorphous, or combinations thereof. In an embodiment, the elastomeric material comprises a vulcanized thermoplastic, an unvulcanized thermoplastic, a thermoset, or combination thereof.

In an embodiment, an elastomeric material suitable for use in this disclosure may be further characterized by a phase transition temperature that is less than or equal to the bottom hole static temperature (BHST) in a wellbore. Herein the phase transition temperature refers to the temperature at which a material undergoes a change in phase (e.g., solid to liquid). In embodiments having a phase transition from a solid to a liquid, the phase transition temperature is also commonly termed the glass transition temperature ($T_g$) when referring to amorphous materials and is commonly termed the melting point ($T_m$) when referring to crystalline materials. Specifically, $T_g$ is the temperature at which amorphous polymers undergo a second order phase transition from a brittle, glassy amorphous solid to a rubbery, soft, amorphous solid. A further increase in temperature may lead to a change of the rubbery, soft, amorphous solid to a softer ductile material and in some cases the material may become a viscous liquid. The extent of the change (i.e., to a soft amorphous solid or to a viscous liquid) may depend on a variety of factors such as the viscoelastic properties of the elastomeric material at the application temperature and the applied stress. In some embodiments, the elastomeric materials may exhibit multiple $T_g$ values depending on the molecular architecture.

The melting point, $T_m$, refers to the temperature at which a crystalline or semi-crystalline polymer undergoes a phase transition from the solid to the liquid phase. A semi-crystalline material will exhibit both a $T_g$ and a $T_m$ due to the presence of crystalline and amorphous phases in the material. In an embodiment, the $T_m$ is less than or equal to the BHST, the $T_g$ is less than or equal to the BHST, or both.

In an embodiment, an elastomeric material suitable for this disclosure has a phase transition temperature (i.e., $T_g$ and/or $T_m$) of from about 75° F. to about 400° F., alternatively from about 120° F. to about 350° F., alternatively from about 150° F. to about 300° F. In an embodiment, the elastomeric material comprises a mixture of one or more component materials wherein the materials differ in phase transition temperature. In such embodiments, the elastomeric material may display more than one phase transition temperature associated with the differing components of the mixture. A suitable elastomeric material may display multiple phase transition temperatures provided that at least one phase transition temperature is less than or equal to the BHST.

In some embodiments, the elastomeric materials may not show a clear solid to liquid phase change but exhibit a behavior known as "cold flow." Cold flow behavior is defined as the distortion, deformation, or dimensional change (i.e., creep) at ambient temperature of a material caused by mechanical factors such as continuous load or gravity and not attributable to thermal factors such as heat softening.

In an embodiment, an elastomeric material suitable for use in this disclosure comprises a viscoelastic solid that exhibits cold flow behavior. Viscoelastic materials exhibit the characteristics of both viscous and elastic materials when undergoing deformation. Viscous materials undergo shear flow and strain linearly and irreversibly with time when a stress is applied, while elastic materials strain instantaneously when stretched and return to their original state instantaneously once the stress is removed. Materials having cold flow behavior may be processed (e.g. pulverized) to form fine particulates which tend to agglomerate upon storage to a single mass due to time-dependent cold flow behavior unless cold flow minimizing materials, also termed agglomeration inhibitors, are present. Examples of agglomeration inhibitors include without limitation talc, silica, or combinations thereof.

The cold flow behavior of the viscoelastic solid may be measured quantitatively in terms of cold flow percentage by modifying the procedure described in U.S. Pat. No. 3,758,656, which is incorporated by reference herein in its entirety. Specifically, the cold flow measurement may be made by placing a cube sample of viscoelastic material under a load of 4.019 lbs 60° C. for a specified time period and measuring the deformation of the cube relative to the original dimensions. Cold flow percentages may be calculated by subtracting the cube sample height before test (t) and after test (t'), dividing by the cube sample height before test (t), and multiplying by 100 (Cold-flow %=(t−t')/t*100). In an embodiment, an elastomeric material suitable for use in this disclosure is a viscoelastic solid having a cold flow percentage measured at 60° C. under a load of 2.87 lb/inch$^2$/hr of equal to or greater than about 10%, alternatively of from 10% to 80%, alternatively of from 30% to 60%. The viscoelastic solid may be further characterized by a $T_g$ of from about −30° C. to about −10° C., alternatively from about −25° C. to about −10° C., alternatively from about −20° C. to about −15° C. and may exhibit cold flow behavior at a temperature less than or equal to about the BHST, alternatively from about 75° C. to about 23° C., alternatively from about 60° C. to about 23° C., alternatively from about 50° C. to about 23° C.

In an embodiment, the SRCC comprises an elastomeric material comprising a bonding polar group. For example, the polar group may bond with the metals in the cement casing (e.g., iron, etc.) and/or the components of the subterranean formations (e.g., iron, calcium, silicate, etc.).

The polar group may comprise an anionic group or a material capable of generating an anionic group. For example, the polar group may comprise a carboxylate, a sulfonate, materials capable of generating a carboxylate or a sulfonate, or combinations thereof. Alternatively, the polar group may comprise a carboxylate.

In an embodiment, an elastomeric material may comprise a carboxylate group having the general formula —COOR, wherein R may be a hydrogen, a metal (for example an alkali metal, an alkaline earth metal, or a transition metal), an ammonium or a quaternary ammonium group, an acyl group (for example acetyl ($CH_3C(O)$) group), an alkyl group (such as an ester), an acid anhydride group, or combinations thereof. Examples of suitable carboxylate groups include without limitation carboxylic acid, carboxy esters, carboxy acid anhydrides, and monovalent, divalent, and trivalent metal salts of carboxy acids, derivatives thereof, or combinations thereof.

In an embodiment, the elastomeric material may comprise a material that has been modified with one or more carboxylic acid derivatives, which can potentially generate carboxylate groups having a general formula of the type described previously herein. For example, the elastomeric material may comprise a polymer that contains one or more carboxylic acid derivatives. The carboxylic acid derivatives may function as precursor carboxylate compounds which may be converted to carboxylate groups. For example a precursor carboxylate compound may be reacted to generate carboxylate groups by exposure to aqueous fluids under basic conditions (e.g., pH>7) and/or to elevated temperatures. Examples of carboxylic acid derivatives that may function as precursor carboxylate compounds include without limitation amides having a general formula C(O)NHR', wherein R' may be a hydrogen, an alkyl group, a hydroxyalkyl group, 2-methyl-1-propane sulfonic acid, or its salts.

In an embodiment, the polar group may be present in the elastomeric material in an amount of from about 0.01 weight percent (wt. %) to about 20 wt. % by total weight of the elastomeric material, alternatively from about 0.1 wt. % to about 15 wt. %, alternatively from about 0.5 wt. % to about 10 wt. %.

The polar group may be introduced into the elastomeric material by any suitable method. In an embodiment, the polar groups may be introduced during formation of the elastomeric material. For example, the elastomeric material may comprise a polymer comprising one or monomers comprising a carboxylate group. In an embodiment, the elastomer comprises a homopolymer, copolymer, terpolymer, random polymer, block polymer, or combinations thereof.

The polar group may be introduced to the elastomeric material via copolymerization of a monomer comprising the polar group (or precursor thereof) with one or more olefin monomers. In an embodiment, polar monomers with groups which may or may not bond to the cementitious material, components of the formation, or components of the casing but increase the overall hydrophilicity of the elastomer may also be used in combination with elastomer forming monomers. Examples of such monomers include without limitation vinyl acetate, ethylene glycol, and the like. The resultant composition, prepared using both elastomer forming monomers and polar monomers which increase the hydrophilicity of the elastomeric material, may exhibit both desirable elastomeric properties and an increase its overall hydrophilic nature.

Examples of suitable elastomeric materials prepared by polymerization include without limitation butadiene, acrylonitrile copolymers, butadiene and styrene copolymers, ethylene and acrylic acid comonomers, copolymers that comprise ethylene and acrylic acid esters, ethylene acrylate copolymers (e.g., SURLYN, ACE 1055, VAMAC, which are commercially available from Dupont), or combinations thereof. As used herein, the terms "copolymer" and "comonomer" are intended to include both the acid form of the copolymer and comonomer, as well as their derivative forms such as esters, amides, anhydrides, imides, and their salts.

In another embodiment, the elastomeric material may comprise a polymeric material onto which one or more polar monomers have been grafted. The grafting may be carried out using any suitable methods, for example by free radical grafting, radiation grafting, plasma grafting, surface grafting, or combinations thereof. In an embodiment, the elastomeric material comprises a polymer having an elastomeric backbone and grafted polar groups.

Examples of monomers suitable for copolymerization and grafting include without limitation styrene, vinyltoluene, alpha-methylstyrene, butadiene, isoprene, hexadiene, dichlorovinylidene, vinyl-chloride, difluorovinylidene, acrylonitrile, ethylene, propylene, butylene, isobutylene, acrylic acid, alkylacrylate, alkyl alkacrylates, maleic acid, maleic anhydrides, diesters and monoesters or maleic acid, maleimide, fumaric acid, vinyl acetate, acrylic acid, acrylamide, 2-acrylamido-2-methyl-1-propane sulfonic acid, salts thereof, derivatives thereof, or combinations thereof. Examples of elastomeric materials comprising grafted polar groups include without limitation maleated polybutadiene, maleated styrene butadiene rubber (SBR), carboxylated hydrogenated styrene butadiene rubber, maleated hydrogenated styrene butadiene rubber, maleated nitrile butadiene rubber, methylmethacrylate butadiene styrene (MBS), maleated ethylene-propylene-diene-monomer (EPDM), sulfonated ethylene-propylene-diene-monomer, acrylic grafted silicone, carboxylated styrene-acrynitrile-butadiene rubbers, maleated ethylene vinyl acetate (e.g., FUSABOND C MC190D and FUSABOND C MC250D, which are commercially available from Dupont Packaging and Industrial Polymers), or combinations thereof.

In an embodiment, the elastomer may comprise one or more monomers at least a portion of which may hydrolyze to form a bonding polar group. Examples of such elastomers include without limitation elastomers comprising acrylonitrile groups that can be hydrolyzed to form carboxylic acid groups. Examples of elastomers comprising monomers that are capable of hydrolyzing to from bonding polar groups include without limitation partially hydrolyzed nitrile rubbers, carboxylated acrylonitrile butadiene styrene (ABS); maleated nitrile butadiene rubber (NBR) referred to as XNBR (e.g., KRYNAC 146 and KRYNAC 750), which are commercially available from Lanxess Corporation; NITRIFLEX NPX 2235, which is commercially available from Nitriflex, Brazil); and carboxylated hydrogenated NBR (e.g., THERBAN XT), which is commercially available from Lanxess Corporation.

The elastomer may have any particle size compatible with the needs of the process. For example, the particle size may be selected by one of ordinary skill in the art with the benefits of this disclosure to allow for easy passage through standard wellbore servicing devices such as for example pumping or downhole equipment. In an embodiment, the elastomer may have a median particle size, also termed d50, of greater than about 500 microns, alternatively of greater than about 550 microns, and a particle size distribution wherein about 90% of the particles pass through a 30 mesh sieve US series.

In some embodiments, the elastomer may further comprise an agglomeration inhibitor to prevent the particles from agglomerating during storage. The agglomeration inhibitor may be contacted with the elastomer for example during the grinding/pulverizing of the elastomer which is typically carried out under cryogenic conditions. Alternatively, the grinding/pulverizing of the elastomer may be carried out using any other suitable process/conditions.

In an embodiment, the elastomeric material may be present in the SRCC in amount of from about 0.5 wt. % to about 25 wt. % by total weight of the SRCC, alternatively from about 1 wt. % to about 20 wt. %, alternatively from about 4 wt. % to about 15 wt. %.

The SRCC may include a sufficient amount of water to form a pumpable slurry. The water may be fresh water or salt water, e.g., an unsaturated aqueous salt solution or a saturated aqueous salt solution such as brine or seawater. The water may be present in the amount from about 24% to about 200% by weight of cement (bwoc), alternatively from about 28% to about 60% bwoc, alternatively from about 35% to about 90% bwoc. The cement may have a density of from about 7 to about 20, alternatively from about 10 to about 18, alternatively from about 13 to about 16 pounds per gallon.

In some embodiments, additives may be included in the SRCC for improving or changing the properties thereof. Examples of such additives include but are not limited to salts, accelerants, set retarders or inhibitors, defoamers, fluid loss agents, weighting materials, dispersants, vitrified shale, formation conditioning agents, or combinations thereof. Other mechanical property modifying additives, for example, carbon fibers, glass fibers, metal fibers, minerals fibers, elastomers that do not contain the polar groups discussed previously herein, and the like can be added to further modify the mechanical properties. These additives may be included singularly or in combination. Methods for introducing these additives and their effective amounts may be determined by one of ordinary skill in the art with the benefit of this disclosure.

In an embodiment, the SRCC may be prepared by combining the cementitious material, the elastomeric material comprising a bonding polar group, water, and optionally one or more additives. The components of the SRCC may be combined using any mixing device compatible with the composition, for example a bulk mixer. In an embodiment, the components of the SRCC are combined at the site of the wellbore. Alternatively, the components of the SRCC are combined off-site and then later used at the site of the wellbore. In an embodiment, the elastomeric material is dry blended with the dry cement at a location remote from the well site, subsequently transported to the well site, formed into a pumpable slurry, and placed down a wellbore. Alternatively, the elastomeric material is added to water which is later contacted with the cementitious material. Alternatively, the elastomeric material injected into the slurry during the cementing operation.

An SRCC prepared as described herein may display an ability to self-repair when the structural integrity of the set cement material is compromised by events such as shrinkage of the cement sheath and/or the formation of cracks or breaks in the cement. Without wishing to be limited by theory, an SRCC comprising an elastomeric material having a phase transition temperature equal to or less than the BHST will result in at least a portion of the material undergoing a phase transition from a solid to liquid when the composition is introduced to the subterranean formation or after it is allowed to set and reach BHST. Without wishing to be limited by theory, the polymer chains in elastomeric materials of the type disclosed herein may be partially crosslinked in situ by calcium ions present in the cement that associate with the bonding polar group of the SRCC, for example carboxylate groups. These types of elastomeric materials (i.e. having a phase transition temperature less than the BHST) will remain as a highly viscous liquid contained within the cement formation (e.g., cement sheath) that is formed during setting of the pumpable slurry. In the event of the loss of structural integrity of the cement sheath (e.g., introduction of cracks, shrinkage), the elastomeric material which has been maintained as a viscous liquid at the BHST may fill and/or bridge the compromised areas in the cement thus restoring at least a portion of the structural integrity of the cement. The formation of chemical interactions (e.g., ionic bonds) between the polar groups in the elastomeric material and components of the cementitious material (e.g., $Ca^{2+}$) and/or to metallic or mineral components in the casing or formation, may further provide a barrier that reduces the permeability of the cement sheath thus increasing the structural integrity of the cement or a barrier in the annulus or microannulus formed between cement and casing or cement and formation. The presence of the viscous elastomeric material that has chemically interacted with the cement and/or casing formation may function as a deformable adhesive that reduces the permeability of the cement by obstructing potential flow pathways thus preventing fluid migration. For example referring to FIG. 1A, an intact cement sheath 10 at BHST may comprise a set cementitious material 20 comprising a viscous elastomeric material 30. Loss of structural integrity of the sheath, FIG. 1B, may be due to the formation of cracks 40 that create void spaces in the sheath that are filled by the deformable viscous elastomeric material. The adherence of the viscous elastomeric material to the cementitious material due to the ionic bonding of the bonding polar group to components of the material serves to position the elastomeric material within the voids of the cracked sheath which functions to obstruct the flow of fluids (e.g., water, oil, or gas) through the voids. In an embodiment, the SRCC self-repairs by the action of the elastomeric material comprising bonding polar groups which functions as an adhesive to prevent the formation of unobstructed pathways when the structural integrity of a cement formation is compromised. In another embodiment, the SRCC is able to self repair in the absence of a fluid (e.g., water, oil, or gas).

In an embodiment, the elastomeric material comprises bonding polar groups and exhibits cold flow behavior. Without wishing to be limited by theory, following the loss of structural integrity in set cement comprising such elastomeric materials, the set cement may self-repair by deformation of the elastomeric materials exhibiting cold flow behavior in response to gravitational forces irrespective of the BHST. These materials may deform to fill voids or cracks introduced to the cement sheath thus obstructing potential flow pathways in the cement.

In an embodiment, the SRCCs of this disclosure may develop a compressive strength (CS) that is comparable to a cement composition lacking an elastomeric material of the type described herein. The compressive strength is the capacity of a material to withstand axially directed pushing forces. The maximum resistance of a material to an axial force is determined using a load frame provided with dual extensometer and circumferential chain extensometer and measured under uniaxial stress-strain mode.

Further, the SRCCs of this disclosure may retain at least a portion of the compressive strength following an event that compromises the structural integrity of the cement. Herein compromising the structural integrity of the cement formation refers to events such as shrinkage or cracks wherein the cement formation has a reduced ability to seal or isolate a zone. Such events have been described previously herein. Hereinafter, an SRCC before an event that results in the loss of structural integrity is referred to as an uncompromised SRCC, while an SRCC that has self-repaired after the loss of structural integrity is referred to as a compromised SRCC. In an embodiment, a compromised SRCC may exhibit a compressive strength of from about 10% to about 100% of the compressive strength of an uncompromised SRCC, alternatively from about 20% to about 70%, alternatively from about 30% to about 50%.

In an embodiment, the SRCCs of this disclosure may display an increased Young's modulus (YM) when compared to an otherwise similar cement composition lacking an elastomeric material of the type described herein wherein the compositions are of similar densities (i.e., water-cement ratio will be decreased when elastomer is added). In another embodiment, the SRCC of this disclosure may display a decreased Young's Modulus when compared to an otherwise similar cement composition lacking an elastomeric material of the type described herein wherein the water-to-cement ratio is maintained same. Young's modulus, also referred to as modulus of elasticity, is a measure of the stiffness of a given material and is determined in accordance with ASTM D 3148-02 (Standard Test Method for Elastic Moduli of Intact Rock Core Specimens in Uniaxial Compression). In an embodiment, an uncompromised SRCC may have a Young's Modulus of from about 10,000 psi to about 3,000,000 psi, alternatively from about 10,000 psi to about 1,500,000 psi, alternatively from about 30,000 psi to about 1,000,000 psi. In another embodiment, a compromised SRCC of this disclosure may have a Young's modulus of from about 20% to about 120% of the Young's modulus of an uncompromised SRCC, alternatively from about 40% to about 80%, alternatively from about 50% to about 70%.

In an embodiment, the SRCCs of this disclosure may display an increased Poisson's Ratio (PR) when compared to an otherwise similar cement composition lacking an elastomeric material of the type described herein. Poisson's ratio refers to the ratio of radial strain (i.e., change in width per unit width) to axial strain (i.e., change in height per unit height), in the case of unconfined compressive tests, and is determined in accordance with ASTM D 3148-02 (Standard Test Method for Elastic Moduli of Intact Rock Core Specimens in Uniaxial Compression). In an embodiment, an uncompromised SRCC may have a Poisson's Ratio of from about 0.1 to about 0.3, alternatively from about 0.15 to about 0.25, alternatively from about 0.18 to about 0.22. In another embodiment, a compromised SRCC may have a Poisson's Ratio of from about 80% to about 200% of the Poisson's ratio of an uncompromised SRCC, alternatively from about 100 to about 150%, alternatively from about 100% to about 120%.

In an embodiment, the SRCCs of this disclosure may display an increased tensile strength when placed in a wellbore when compared to an otherwise similar cement composition lacking an elastomeric material of the type described herein. Tensile strength of a material is the maximum amount of tensile stress that it can be subjected to before failure. Tensile strengths may be measured on cylindrical samples using a load frame and measured under uniaxial stress-strain mode, as determined in accordance with ASTM D3967, also known as the Brazilian tensile test or Splitting Tensile test. In an embodiment, an uncompromised SRCC may have a tensile strength of from about 100 psi to 900 psi, alternatively from about 200 psi to about 700 psi, alternatively from about 400 psi to about 600 psi. In an embodiment, a compromised SRCC exhibits a tensile strength of from about 5% to about 80% of the tensile strength of an uncompromised SRCC, alternatively from about 10% to about 60%, alternatively from about 20% to about 50%.

In an embodiment, a cement formation prepared from an SRCC of this disclosure displays a reduced permeability after an event that compromises the structural integrity of the formation when compared to an otherwise similar compromised cement composition lacking an elastomeric material of the type described herein. The permeability of a set cement composition may be determined by measuring the rate of fluid flow through a cement plug at a user defined temperature, under a fluid flow pressure, and a plug confining pressure until the flow rate reaches a stable value. In an embodiment, the permeability of a compromised cement composition is measured by using a plug that has been cracked (compromised) axially in the flow direction using a device such a load frame or a vise and applying pressure gradually until the sample cracks. In such an embodiment, the crack in the sample extends from one end to the other (i.e. axially) without extending radially. The self repair ability in the presence of fluid may be measured by flowing the fluid through the core of the cement plug while raising the temperature of the fluid and the plug, and measuring the fluid flow rate during and after the heating phase. For measuring the self repair ability in absence of a fluid, the plug may be heated until it reaches the set temperature, and then a preheated fluid is flowed through the core. The time required to self repair may be measured by preheating the plug in the absence of a fluid and holding the plug at a set temperature for different periods of time prior to flowing the preheated fluid. In an embodiment, a compromised SRCC may have a permeability, after self-repair, to fluids (e.g., water, oil, gas, etc.) that is reduced by from about 20% to about 100% when compared to the permeability of a compromised and otherwise similar cement composition (e.g., similar density or water/cement ratio) lacking an elastomeric of the type described herein, alternatively from about 30% to about 90%, alternatively from about 50% to about 80%.

The SRCCs as disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. The wellbore servicing fluid comprising an SRCC can be used for any purpose. In an embodiment, the wellbore servicing composition comprising an SRCC is used to service a wellbore that penetrates a subterranean formation, for example by pumping the wellbore servicing composition slurry comprising an SRCC downhole. It is to be understood that "subterranean formation" encompasses both areas below exposed earth and areas below earth covered by water such as ocean or fresh water. Examples of servicing fluids include, but are not limited to, cement slurries, drilling fluids or muds, spacer fluids, fracturing fluids or completion fluids. Without limitation, servicing the wellbore includes positioning a sealant composition (e.g., SRCC) in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

The SRCC may be introduced to the wellbore to prevent the loss of aqueous or non-aqueous drilling fluids into loss-circulation zones such as voids, vugular zones, and natural or induced fractures while drilling. In an embodiment, the SRCC is placed into a wellbore as a single stream and activated by downhole conditions to form a barrier that substantially seals loss circulation zones. In such an embodiment, the SRCC may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The SRCC may form a non-flowing, intact mass with good strength and capable of withstanding the hydrostatic pressure inside the loss-circulation zone. Said SRCC may plug the zone and inhibit the loss of subsequently pumped drilling fluid thus allowing for further drilling. It is to be understood that, it may be desired to hasten the viscosification reaction for swift plugging of the voids. Alternatively, it may be desired to prolong or delay the viscosification for deeper penetration into the voids. For example the SRCC may form a mass that plugs the zone at elevated temperatures, such as those found at higher depths within a wellbore.

In an embodiment, the SRCC may be employed in well completion operations such as primary and secondary cementing operations. The SRCC may be placed into an annulus of the wellbore and allowed to set such that it isolates the subterranean formation from a different portion of the wellbore. The SRCC thus forms a barrier that prevents fluids in that subterranean formation from migrating into other subterranean formations. Within the annulus, the SRCC also serves to support a conduit, e.g., casing, in the wellbore. In an embodiment, the wellbore in which the SRCC is positioned belongs to a multilateral wellbore configuration. It is to be understood that a multilateral wellbore configuration includes at least two principal wellbores connected by one or more ancillary wellbores.

In secondary cementing, often referred to as squeeze cementing, the SRCC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

The ability of an SRCC of the type disclosed herein to self repair at about wellbore ambient temperature was investigated. Sample 1 was prepared to form two cement cylinders by mixing Class H cement, water in an amount of 35.15% by weight of the cement (bwoc), and FUSABOND C MC190D in an amount of 4% bwoc to form cement slurries with a density of 16.4 pounds per gallon. FUSABOND C MC190D is an ethylene vinyl acetate copolymer grafted with maleic anhydride with a melting point of 160° F., which is commercially available from Dupont Packaging and Industrial Polymers. The slurry was then cured in 2"×5" metal cylinders at 190° F. for 72 hours under a pressure of 3,000 psi to form set cement cylinders.

One cylinder, designated Sample 1, was then cut into three cylindrical pieces and the pieces were held together with a C-clamp. Next, Sample 1 was cured in an oven at a temperature of 180° F. for 24 hours. Once Sample 1 was taken out of the oven, the three pieces fused together and could not be manually separated into the original three pieces.

Example 2

The effects of the elastomer type on the mechanical properties of the SRCCs were investigated. Two samples, designated Samples 2 and 3, were prepared and used to form two cement cylinders as described in Example 1. Each sample contained elastomer in an amount of 4% bwoc. Sample 2 contained FUSABOND C MC250D which is a ethylene vinyl acetate copolymer grafted with maleic anhydride with a melting point of 160° F. and a higher level of maleic anhydride than FUSABOND C MC1190D which was used in Example 1. Sample 3 contained FUSABOND N MF416D, an ethylene propylene copolymer product grafted with maleic anhydride with a melting point of 86° F. The cylinders were cut and thermally cured as described in Example 1. After curing, the pieces of Sample 2 which was prepared using FUSABOND C MC250D (grafted ethylene vinyl acetate copolymer) fused together. However, the pieces of Sample 3, which was prepared with FUSABOND N MF416D (grafted ethylene propylene copolymer) did not fuse together. The results suggested that the presence of a polar comonomer in Sample 2, in addition to the functional group capable of forming bonds with cementitious materials, facilitated its ability to self repair.

Example 3

The mechanical properties of SRCCs comprising viscoelastic elastomeric materials that exhibit cold flow behavior were investigated. Two additional samples, Samples 4 and 5 were prepared using ground acrylonitrile butadiene acrylate polymers with a 10 to 20 particle mesh size as the elastomeric materials. These samples were prepared and used to form cement cylinders as described in Example 1. Sample 4 contained KRYNAC X146, an acrylonitrile butadiene acrylate polymer with 32.5% acrylonitrile content and 1% carboxylation, which is commercially available from Lanxess Corporation. Sample 5 contained KRYNAC X750, an acrylonitrile butadiene acrylate terpolymer with 27% acrylonitrile and 7% carboxylation, which is commercially available from Lanxess Corporation. Both KRYNAC X146 and KRYNAC X750 did not show a discrete melting point by DSC measurement. However, both KRYNAC X146 and KRYNAC X750 showed cold flow behavior upon storage at room temperature when their ground materials agglomerated to form a single rubbery mass.

The cylinders (Samples 4 and 5) were cut and thermally cured as described in Example 1. The cut cylinders (Samples 4 and 5) fused together when thermally heated and cooled as described in Example 1, which demonstrated that the these materials facilitated the ability of the SRCC to self repair.

Next, the cold flow behavior of both KRYNAC X146 and KRYNAC X750 were investigated. The cold flow percentages were determined at 60° C. using a load of 4.019 lbs as described previously herein. The results from cold flow measurements are shown in Table 1.

TABLE 1

| | | | Dimension before Test | | | Dimension After test | | | |
|---|---|---|---|---|---|---|---|---|---|
| Sample | Elastomer | Weight (g) | Length (in) | Width (in) | Height (t, in) | Length (in) | Width (in) | Height ($t^1$, in) | Cold-Flow (%) |
| 4 | KRYNAC X146 | 23.251 | 1.191 | 1.177 | 1.176 | 1.657 | 1.619 | 0.615 | 48 |
| 5 | KRYNAC X750 | 20.918 | 1.258 | 1.115 | 1.042 | 1.829 | 1.526 | 0.529 | 49 |

The results demonstrate these elastomers that do not show a solid-liquid transition temperature yet exhibit cold flow behavior and contain a bonding polar group (i.e., carboxylate) and a polar monomer (i.e., acrylonitrile) were able to facilitate the self repair of a structurally compromised cementitious material.

Figure 2:
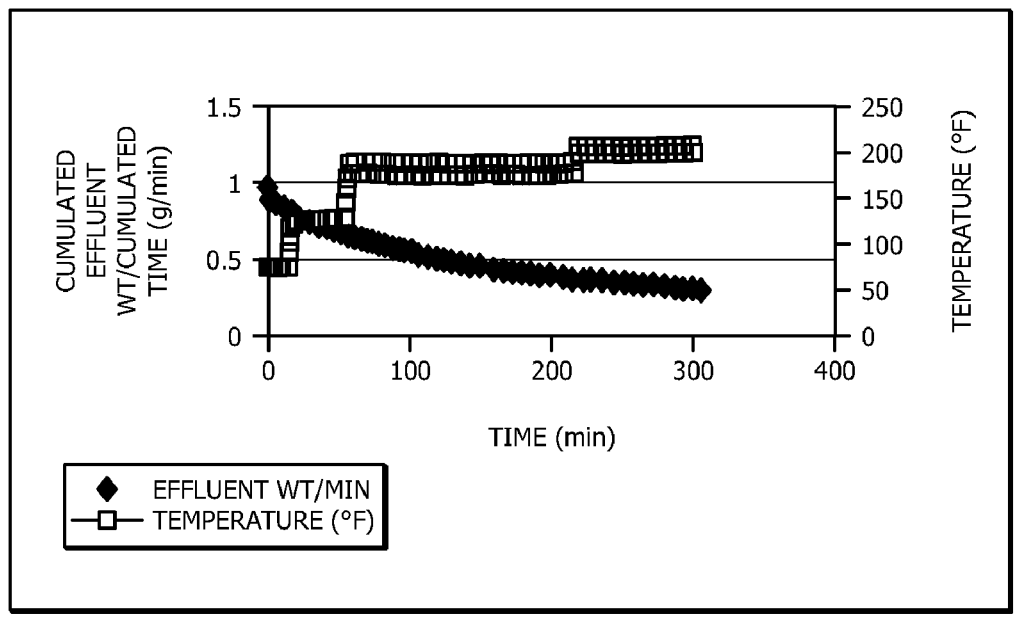
FIG. 2 is a plot of cumulated effluent weight/cumulated time and temperature as a function of time for the samples from Example 3.
Figure 3:
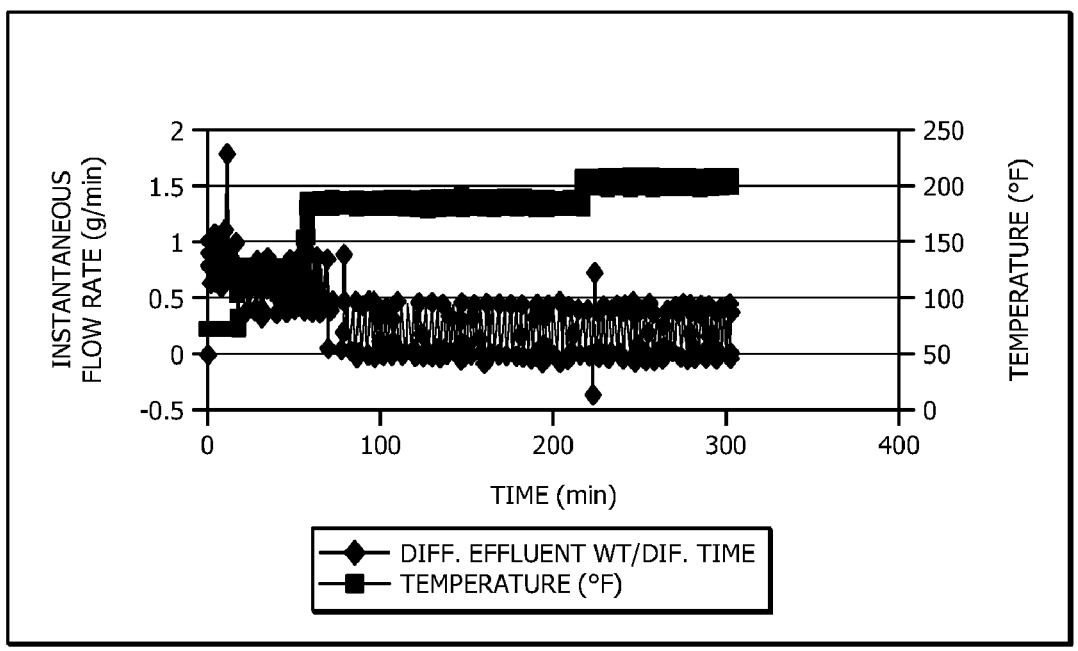
FIG. 3 is a plot of instantaneous flow rate and temperature as a function of time for the samples from Example 3.

The self repairing ability of KRYNAC X750 was further investigated by measuring its flow rate through fractured cement plugs placed in a Hassler sleeve apparatus. The samples were cracked in a vise and those plugs which showed continuous axial cracks were selected. The confining pressure on the plug was 400 psi, and water was injected at a pressure of 100 psi with no backpressure on the exit end of the plug. Two experiments were carried out. The first experiment was carried out initially at room temperature, and then the temperature was increased to 140° F., 160° F., and finally 200° F. FIG. 2 is a plot of the cumulated effluent/cumulated time (i.e., total wt of water collected/total time) and temperature as a function of time, while FIG. 3 is a plot of instantaneous flow rate and temperature (i.e., wt of water collected per minute between two consecutive readings) as a function of time. Referring to FIGS. 2 and 3, the flow rate of KRYNAC X750 decreased as the temperature increased over time.

Figure 4:
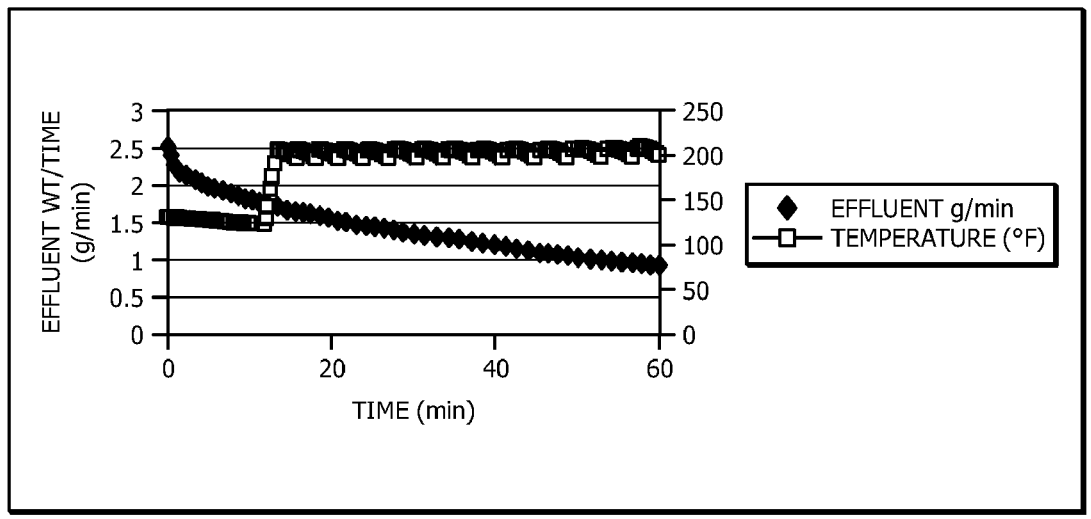
FIG. 4 is a plot of effluent weight/time and temperature as a function of time for the samples from Example 3 using preheated cement plug that has been cracked.
Figure 5:
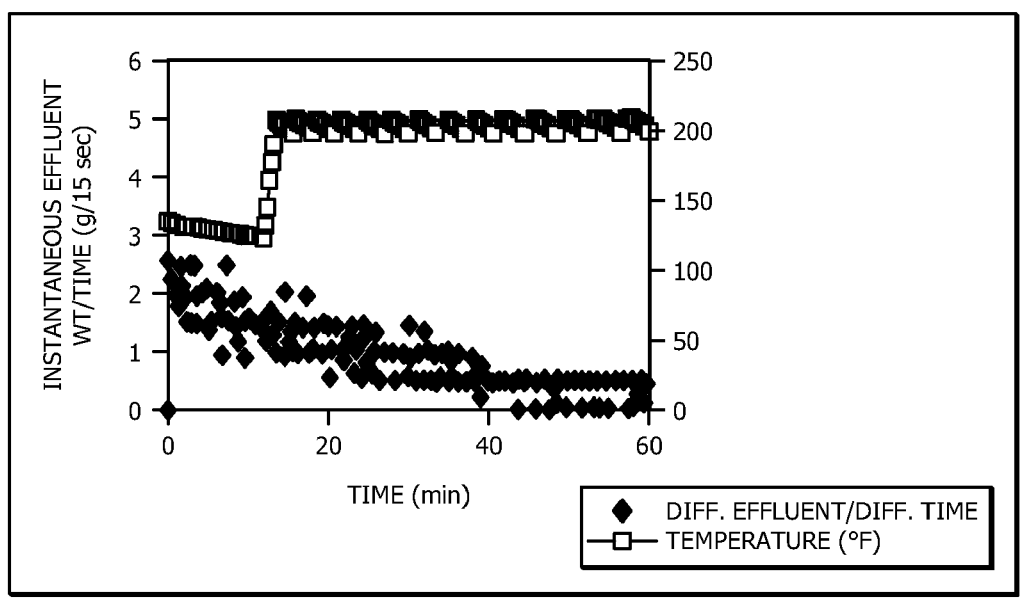
FIG. 5 is a plot of instantaneous effluent weight/time and temperature as a function of time for the samples from Example 3 using preheated cement plug that has been cracked.

A second experiment was carried out by first preheating the cement plugs at 180° F. This approach was to demonstrate that self-repairing of the cement composition is fluid independent. FIGS. 4 and 5 are dual axis plots that are similar to those presented in FIGS. 2 and 3 respectively. These results also showed that the flow rate of KRYNAC X750 decreased as the temperature increased over time and the compositions are able to self repair. Collectively, FIGS. 2 to 5 illustrate that the elastomers with cold flow behavior of these polymers are suitable for conferring self repair ability to the composition.

were prepared and designated Samples 1A-5A. These samples were tested to failure under load-displacement conditions as well as a three-point bend flexural test, repaired by thermally re-curing as described in Example 1, and tested again. The three-point bending flexural test was a simple load versus displacement test where the load was measured in pounds and sample dimensions were not used to calculate stress and strain values. The elastic modulus, or modulus of elasticity, is the mathematical description of an object or substance's tendency to be deformed elastically (i.e., non-permanently) when a force is applied to it. The elastic modulus of an object is defined as the slope of its stress-strain curve in the elastic deformation region:

$$\lambda \stackrel{def}{=} \frac{stress}{strain}$$

where $\lambda$ (lambda) is the elastic modulus; stress is the force causing the deformation divided by the area to which the force is applied; and strain is the ratio of the change caused by the stress to the original state of the object. The compressive strength (CS), Young's modulus (YM), Poisson's Ratio (PR), tensile strength, Flexural strength, were determined for each sample in accordance with the previously described methods. The mentioned properties were determined for both the originally set composition, denoted Graft polymer, and the sample after failure and repair, denoted after repair. These values are presented in Table 2.

TABLE 2

| Sample | Polymer Type | CS (Load vs. Displacement) psi | YM (e + 6) psi | PR | Tensile Strength psi | Flex (3-pt bend) Stength, psi |
|---|---|---|---|---|---|---|
| 1A | Graft polymer | 4970 | 1.93 | 0.18 | 470 | 874 |
|  | After repair | 2915 | 2.07 | High | n/a | 140 |
| 2A | Graft polymer | 3780 | 1.55 | 0.14 | 400 | 1325 |
|  | After repair | n/a | n/a | n/a | 116 (avg, highest value 202 psi) | 185 |
| 3A | Graft polymer | 3870 | 1.87 | 0.18 | 450 | 965 |
| 4A | Random terpolymer | 2370 | 1.58 | 0.17 | 430 | 964 |
|  | After repair | n/a | n/a | n/a | 180 | 110 |
| 5A | Random terpolymer | 5160 | 2.01 | 0.21 | 470 | n/a |

The same experiment was repeated with new compromised plugs however, the pre-heated plugs were held at the test temperature for different lengths of time before exposing the plugs to fluid flow to investigate the effect of the pre-heating periods (equivalent to a shut in time in a wellbore situation) on the self repairing ability of the cement compositions. The results are shown in FIG. 6.

Figure 6:
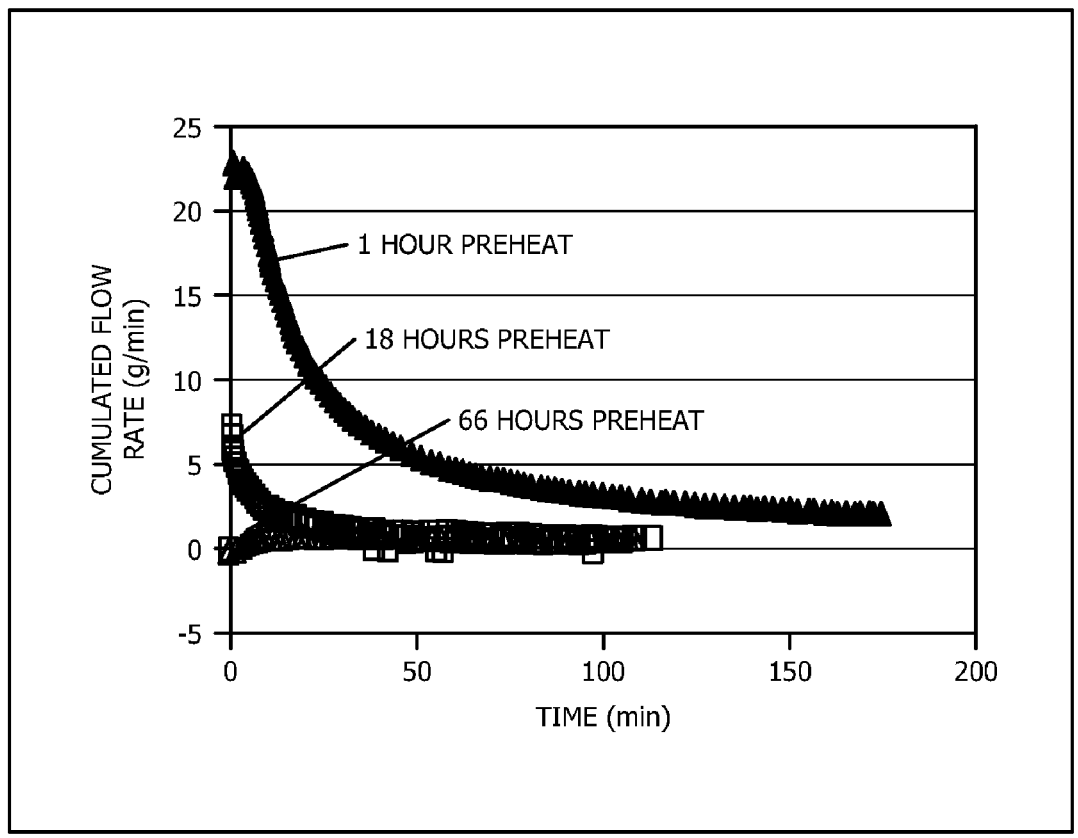
FIG. 6 is a plot of cumulative flow rate as a function of time for the samples from Example 3.

Referring to FIG. 6, the results demonstrate that self repairing improves with increased preheating duration suggesting that a shut-in period may be optimized to achieve an optimum permeability reduction of a compromised cement composition.

Example 4

The mechanical properties of SRCCs of the type disclosed herein that have been compromised were compared to otherwise similar uncompromised SRCCs. Five cement cylinders similar to those designated Samples 1-5 in Examples 1 to 3

Referring to Table 2, the results demonstrate that SRCCs of the type described herein retained sufficient compressive strength to be load bearing after failure and repair. Further, the results demonstrated that tensile and flexural strengths are also retained after failure and repair.

Without wishing to be limited by theory, the polar groups in the polymer can provide strong bonding to the cement matrix because the polymers will become viscous materials during re-curing and reform adhesive bonds to the elastomeric materials on the fracture surface, in the casing, in the formation, or to the cement matrix. For example, in the case of ethylene vinyl acetate containing grafted carboxylate groups such as in Samples 1 and 2, hydrolysis of acetate groups upon contact with alkaline pH of the cementitious material would generate alcohol groups which would also interact and adhere to the cement matrix. A similar hydrolysis would be expected to occur in the case of SRCCs containing cold flow elastomeric materials (e.g. acrylonitrile butadiene acrylate) due to the hydrolysis upon contact of the high pH cement fluids with the nitrile moieties to produce carboxylate groups.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
   placing a cement composition comprising a cementitious material, water, and an elastomeric material comprising a bonding polar group into a wellbore; and
   allowing the cement composition to set to form a set cement, wherein the elastomeric material has a phase transition temperature, exhibits cold flow behavior, or both at less than or equal to the bottom hole static temperature of the wellbore, wherein upon loss of structural integrity the set cement self-repairs and forms a self-repaired cement and wherein the self-repaired cement has a permeability that is reduced by from about 20% to about 100% when compared to the permeability of an otherwise similar cement composition lacking an elastomeric material comprising a polar group that bonds to the cementitious material.

2. The method of claim 1 wherein the elastomeric material has a phase transition temperature of from about 73° F. to about 400° F.

3. The method of claim 1 wherein the bonding polar group may bond to the cementitious material, components of the formation, components of the casing, or both.

4. The method of claim 1 wherein the elastomeric material comprises a viscoelastic solid.

5. The method of claim 4 wherein the viscoelastic solid has a cold flow percentage of equal to or greater than about 10%.

6. The method of claim 4 wherein the viscoelastic solid has a glass transition temperature of from about −30° C. to about −10° C.

7. The method of claim 1 wherein the polar group comprises an anionic group or a material capable of generating an anionic group.

8. The method of claim 1 wherein the polar group comprises a carboxylate group, a sulfonate group, or combinations thereof.

9. The method of claim 8 wherein the carboxylate group has the formula of —COOR wherein R is a hydrogen, a metal, an ammonium group, a quaternary ammonium group, an acyl group, an alkyl group, an acid anhydride group, or combinations thereof.

10. The method of claim 1 wherein the elastomeric material comprises a material capable of generating a carboxylate group.

11. The method of claim 1 wherein the elastomeric material comprises acrylonitrile copolymers, copolymers of butadiene and styrene, copolymers of ethylene and acrylic acid, copolymers of styrene and acrylic acid esters, ethylene acrylate copolymers, maleated polybutadiene, maleated styrene butadiene rubber, carboxylated hydrogenated styrene butadiene rubber, maleated hydrogenated styrene butadiene rubber, maleated nitrile butadiene rubber, methylmethacrylate butadiene styrene, maleated ethylene-propylene-diene-monomer, sulfonated ethylene-propylene-diene-monomer, acrylic grafted silicone, carboxylated styrene-acrynitrile-butadiene rubbers, maleated ethylene vinyl acetate, partially hydrolyzed nitrile rubbers, carboxylated acrylonitrile butadiene styrene, carboxylated hydrogenated nitrile butadiene rubber, or combinations thereof.

12. The method of claim 1 wherein the polar group was introduced into the elastomeric material by copolymerizing a monomer comprising the polar group with one or more olefin monomers, by grafting of a monomer comprising the polar group to an elastomer, by partially hydrolyzing an elastomer comprising monomers that are capable of hydrolyzing to form a polar group, or combinations thereof.

13. The method of claim 12 wherein the elastomer further comprises additional polar monomers which increase the overall hydrophilicity of the elastomer.

14. The method of claim 12 wherein the monomer comprising the polar group comprises acrylic acid, alkylacrylate, alkyl alkacrylates, maleic acid, maleic anhydrides, diesters and monoesters or maleic acid, maleimide, fumaric acid, vinyl acetate, acrylic acid, acrylamide, 2-acrylamido-2-methyl-1-propane sulfonic acid, salts thereof, derivatives thereof, or combinations thereof.

15. The method of claim 12 wherein the elastomeric material comprises a polymer formed by the polymerization of styrene, vinyltoluene, alpha-methylstyrene, butadiene, isoprene, hexadiene, dichlorovinylidene, vinyl-chloride, difluorovinyledene, acrylonitrile, ethylene, propylene, butylene, isobutylene, vinyl acetate, ethylene glycol, derivatives thereof, or combinations thereof.

16. The method of claim 1 wherein the polar group is present in the elastomeric material in an amount of from about 0.01 wt. % to about 20 wt. % by weight of the elastomer.

17. The method of claim 1 wherein the elastomeric material is present in the cement composition in an amount of from about 0.5 wt. % to about 25 wt. % by total weight of the cement composition.

18. The method of claim 1 wherein the elastomeric material has a median particle size of equal to or greater than about 500 microns.

19. The method of claim 1 wherein the set cement has a Young's modulus of from about 10,000 psi to about 3,000,000 psi.

20. The method of claim 1 wherein the set cement has a Poisson's Ratio of from about 0.1 to about 0.3.

21. The method of claim 1 wherein the set cement loses structural integrity by forming cracks, shrinking, debonding from a structure, cement casing, wellbore conduit, formation, or combinations thereof.

22. The method of claim 1 wherein the set cement self repairs by obstructing potential flow pathways formed in the set cement due to the loss of structural integrity.

23. The method of claim 1 wherein the self-repaired cement has a compressive strength of from about 10% to about 100% of the compressive strength of the set cement.

24. The method of claim 1 wherein the self-repaired cement has a Young's modulus of from about 20% to about 120% of the Young's modulus of the set cement.

25. The method of claim 1 wherein the self-repaired cement has a Poisson's Ratio of from about 80% to about 200% of Poisson's ratio of the set cement.

26. The method of claim 1 wherein the self-repaired cement has a tensile strength of from about 5% to about 80% of the tensile strength of the set cement.

27. The method of claim 1 wherein the elastomeric material further comprises an agglomeration inhibitor.

28. The method of claim 1 wherein the elastomeric material has a median particle size of greater than about 500 microns.

29. A method of servicing a cased wellbore penetrating a formation, comprising:
   introducing a self-repairing cementitious material into a wellbore; and
   allowing the cement to set,
   wherein upon a loss of structural integrity the set cement self-repairs and forms a self repaired cement,
   and wherein the loss of structural integrity comprises the formation of flow pathways for fluid migration in the cement and self-repair comprises obstructing potential pathways for fluid migration and wherein the self-repaired cement has a permeability that is reduced by from about 20% to about 100% when compared to the permeability of an otherwise similar cement composition lacking an elastomeric material comprising a polar group that bonds to the cementitious material.

30. The method of claim 29 wherein the cementitious material comprises an elastomeric material comprising a bonding polar group, wherein the polar group bonds with two or more of the set cement, the casing, or the formation.

* * * * *